Aug. 12, 1924.  1,504,685
A. GERMOT
PROCESS FOR MANUFACTURING OXIDE OF WHITE ANTIMONY
Filed Sept. 11, 1922
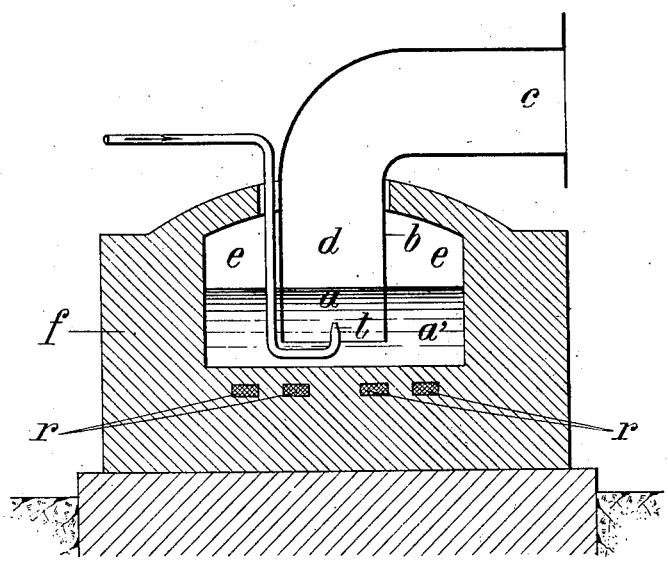
Inventor:
A. Germot.
By
Langner, Parry, Card + Langner
Attys.

Patented Aug. 12, 1924.

1,504,685

UNITED STATES PATENT OFFICE.

ANTONIN GERMOT, OF ASNIERES, FRANCE.

PROCESS FOR MANUFACTURING OXIDE OF WHITE ANTIMONY.

Application filed September 11, 1922. Serial No. 587,451.

*To all whom it may concern:*

Be it known that I, ANTONIN GERMOT, a citizen of the Republic of France, and residing at Asnieres, Seine, 56 Rue de la Marne, France, have invented a Process for Manufacturing Oxide of White Antimony.

This invention relates to a process of manufacture whereby an oxide of antimony of a definite and absolutely constant composition, with the minimum of oxidation and capable of being employed in paints, can be obtained.

Heretofore the production of the oxide of antimony was limited only to the production of the metal, the obtainment of an oxide of antimony, suitable for paints, of a well defined formula, and of a constant composition, being a problem not yet solved. In fact, in the roasting process universally employed, the exothermic reaction which accompanies the production, changing at every moment, and in a very appreciable way, the working of the furnace employed, cannot be regulated according to its different phases. Further, this reaction varies in intensity in proportion to the impoverishment in sulphur of the heated mass. In these conditions, it is difficult, if not impossible, to obtain a suitable oxide for use in paints.

In the process forming the subject of the present invention, an oxide is obtained of a definite and absolutely constant composition with a minimum of oxidation, and constituting the pigment which is best suitable in the preparation of the paint.

The operation consists either in causing atmospheric air or a gas containing oxygen, to act on the metallic antimony, which has been previously melted, or in injecting into the mass of metal melted in a closed vessel, the same elements as above, atmospheric air or a gas containing oxygen, accompanied, or not, by water, or steam.

The operation in a closed vessel is that which enables the oxide of a constant composition with the minimum of oxidation to be obtained.

The succession of operations takes place as follows: Fused antimony is led into the furnace and then air is blown into the fused mass, and all exterior heating is suppressed. The antimony oxide which is formed escapes in the form of clouds and is deposited in receiving chambers. Gradually, and as fast as required, lumps of antimony are added to the molten bath.

The reaction must be carried out in a tightly closed chamber for otherwise the presence of air above the bath, would suffice to transform the antimony oxide $Sb_2O_3$ into a higher oxide $Sb_2O_4$ or $Sb_2O_5$, which it is absolutely necessary to avoid since the higher oxides render the resulting product wholly unfitted for manufacture of paint.

The necessity for adding lumps of antimony to the bath without permitting at the same time any entrance of air thereon necessitates employing in this operation, furnaces constructed in a special manner.

By way of example there is shown in the accompanying drawing a diagram of an apparatus capable of being used for commercially carrying out this process of manufacture.

A furnace $f$, in masonry, heated to the appropriate temperature by any known means, preference being given to electrical resistances $r$, receives an inverted bell $b$, provided with one or more blowing in tubes $t$ which open at the lower part of the furnace, the orifices of the tubes being disposed above the lower edge of the bell. The bell $b$, dipping into the metallic bath $a'$, thus forms a closed chamber $d$ in which is only the air or oxygen blown in by tubes $t$, even though the rest of the metallic bath is in contact with the atmosphere, as is the case shown by the drawing. In these conditions, the air being blown in through blast-pipes, such as $t$ oxidizes the molten metallic antimony $a$; the oxide formed which is in the state of clouds of impalpable powder, is caught up and is discharged through the neck C, and collects in settling chambers, not shown in the drawings.

The metal composing the bath $a$, $a'$ may have been previously obtained by any suitable means, and preferably by the process forming the subject of applicant's U. S. Patent 1,475,294.

It is to be understood that the particular arrangements whereby the reaction of oxidation is obtained in a closed vessel, by the help of a bath which may be open to the air, as well as the form of furnace employed, and the mode of heating, such as by charcoal, gas, coal, mazout, electricity, etc., may be varied without departing from the principle of the reactions.

Having now particularly described my invention and in what manner the same is to be performed what I claim is:

A process for making pure $Sb_2O_3$ suitable for the manufacture of paints and free from higher oxides, comprising blowing an oxygen containing gas into a bath of molten antimony which is held in a closed chamber, and collecting the thus formed clouds of oxide of antimony in receiving chambers.

In testimony whereof I have signed my name to this specification.

ANTONIN GERMOT.